US010574014B2

(12) United States Patent
Smith et al.

(10) Patent No.: US 10,574,014 B2
(45) Date of Patent: Feb. 25, 2020

(54) METHOD FOR SEALING ELECTRIC TERMINAL ASSEMBLY

(71) Applicant: Aptiv Technologies Limited, St. Michael (BB)

(72) Inventors: Robert A. Smith, Murrysville, PA (US); Gina Sacco, Warren, OH (US); Sean P. Krompegel, Canfield, OH (US); Evangelia Rubino, Warren, OH (US); Christopher R. Rudzinskas, Warren, OH (US)

(73) Assignee: Aptiv Technologies Limited (BB)

( * ) Notice: Subject to any disclaimer, the term of this patent is extended or adjusted under 35 U.S.C. 154(b) by 311 days.

(21) Appl. No.: 15/469,953

(22) Filed: Mar. 27, 2017

(65) Prior Publication Data
US 2018/0278003 A1    Sep. 27, 2018

(51) Int. Cl.
*H01R 43/00*    (2006.01)
*H01R 13/52*    (2006.01)

(52) U.S. Cl.
CPC ....... *H01R 43/005* (2013.01); *H01R 13/5216* (2013.01); *Y10T 29/49176* (2015.01)

(58) Field of Classification Search
CPC ......... Y10T 29/49176; Y10T 29/49174; Y10T 29/49181; Y10T 29/49183; Y10T 29/19185; H01R 43/005; H01R 13/533; H01R 13/5219; H01R 13/5216; C08F 2/46; C08F 2/48
USPC .......................................... 29/858, 857, 885
See application file for complete search history.

(56) References Cited

U.S. PATENT DOCUMENTS

| 2,739,888 | A |   | 3/1956  | Sawdey |
|-----------|---|---|---------|--------|
| 2,739,971 | A |   | 3/1956  | Sawdey et al. |
| 3,004,896 | A |   | 10/1961 | Hansjorg et al. |
| 3,125,597 | A |   | 3/1964  | Wahl et al. |
| 3,253,921 | A |   | 5/1966  | Sawdey |
| 3,445,229 | A | * | 5/1969  | Webers .................. G03F 7/027 430/255 |
| 3,723,154 | A |   | 3/1973  | Oliver |
| 4,045,229 | A |   | 8/1977  | Weber, II et al. |

(Continued)

FOREIGN PATENT DOCUMENTS

EP    363820 A2    4/1990
EP    393407 A1    10/1990

(Continued)

OTHER PUBLICATIONS

"Self-Healing Polymer Films Based on Thiol Disulfide Exchange Reactions and Self-Healing Kinetics Measured Using Atomic Force Microscopy", Jeong Ae Yoon, et al., Macromolecules, ACS Publications, Dec. 16, 2011.

Primary Examiner — Peter Dungba Vo
Assistant Examiner — Kaying Kue
(74) Attorney, Agent, or Firm — Robert J. Myers

(57) ABSTRACT

A method is disclosed of sealing a wire terminal assembly including a conductive cable core connected to a conductive terminal along a conductive connection interface. According to the method, a coating composition is dispensed over the conductive connection interface. The coating composition includes (1) a polymerizable compound with an unsaturated bond, and (2) a free radical photoinitiator. The dispensed coating composition is then subjected to actinic radiation for a duration of less than 0.7 seconds.

20 Claims, 1 Drawing Sheet

(56) References Cited

U.S. PATENT DOCUMENTS

| | | | |
|---|---|---|---|
| 4,218,294 A * | 8/1980 | Brack | C08F 283/04 |
| | | | 427/154 |
| 4,250,203 A * | 2/1981 | Schlesinger | C08F 2/50 |
| | | | 427/386 |
| 4,783,394 A | 11/1988 | Hirose et al. | |
| 4,839,274 A | 6/1989 | Logan | |
| 4,849,326 A | 7/1989 | Besio et al. | |
| 4,877,818 A * | 10/1989 | Emmons | G03F 7/027 |
| | | | 522/26 |
| 4,902,578 A * | 2/1990 | Kerr, III | C08J 7/047 |
| | | | 427/508 |
| 4,996,326 A | 2/1991 | Leppard et al. | |
| 5,084,375 A | 1/1992 | Umemoto et al. | |
| 5,112,728 A | 5/1992 | Tanji et al. | |
| 5,200,307 A | 4/1993 | Takahashi | |
| 5,202,222 A * | 4/1993 | Harris | C09D 5/4411 |
| | | | 204/488 |
| 5,215,876 A | 6/1993 | Pruett et al. | |
| 5,300,414 A | 4/1994 | Leppard et al. | |
| 5,320,250 A | 6/1994 | La et al. | |
| 5,395,862 A | 3/1995 | Neckers | |
| 5,451,343 A | 9/1995 | Neckers et al. | |
| 5,747,102 A | 5/1998 | Smith et al. | |
| 6,253,957 B1 | 7/2001 | Messerly et al. | |
| 6,380,278 B1 | 4/2002 | Fan et al. | |
| 6,472,069 B1 | 10/2002 | Bailey et al. | |
| 6,559,260 B1 | 5/2003 | Fan et al. | |
| 6,803,092 B2 * | 10/2004 | Pocius | C09D 5/4434 |
| | | | 174/251 |
| 9,325,085 B2 * | 4/2016 | Tanaka | H01R 4/185 |
| 9,401,549 B2 * | 7/2016 | Kumakura | H01R 4/04 |
| 9,437,938 B2 * | 9/2016 | Ohnuma | H01R 4/185 |
| 9,787,002 B1 * | 10/2017 | Smith | C08F 290/061 |
| 10,017,659 B1 * | 7/2018 | Smith | C09D 133/14 |
| 2001/0025061 A1 * | 9/2001 | Wu | G02B 1/045 |
| | | | 522/33 |
| 2002/0086161 A1 * | 7/2002 | Smetana | C08F 283/10 |
| | | | 428/413 |
| 2003/0149179 A1 | 8/2003 | Chao et al. | |
| 2004/0054798 A1 | 3/2004 | Frank et al. | |
| 2005/0154121 A1 | 7/2005 | Fan et al. | |
| 2006/0111493 A1 * | 5/2006 | Choi | C08K 5/103 |
| | | | 524/317 |
| 2008/0050951 A1 | 2/2008 | Wu | |
| 2009/0264011 A1 | 10/2009 | Wang | |
| 2009/0311457 A1 * | 12/2009 | Share | A23L 3/3436 |
| | | | 428/36.92 |
| 2011/0067239 A1 | 3/2011 | Martauz et al. | |
| 2012/0276503 A1 * | 11/2012 | Wang | A61K 6/0017 |
| | | | 433/217.1 |
| 2014/0315142 A1 * | 10/2014 | Montgomery | A61C 19/066 |
| | | | 433/29 |
| 2016/0089681 A1 | 3/2016 | Saidman et al. | |
| 2016/0136889 A1 * | 5/2016 | Rolland | B29C 64/386 |
| | | | 264/1.27 |
| 2017/0240658 A1 * | 8/2017 | Chang | C08F 2/48 |

FOREIGN PATENT DOCUMENTS

| | | |
|---|---|---|
| EP | 246553 A2 | 7/1991 |
| EP | 190003 A2 | 9/1991 |
| EP | 530135 A1 | 3/1993 |
| EP | 323408 A1 | 4/1994 |
| EP | 345514 A2 | 8/1994 |
| EP | 451813 A1 | 3/1997 |
| EP | 531258 A1 | 9/1997 |
| JP | 2011113708 | 6/2011 |

* cited by examiner

METHOD FOR SEALING ELECTRIC TERMINAL ASSEMBLY

BACKGROUND

The field of this disclosure relates to an electrical connection between a cable and a terminal.

Cable terminal connections are commonly used to facilitate electrical connections between various electrical or electronic components and sub-components. The designs are myriad, and common features include a physical and electrically-conductive connection between a terminal and an electrically-conductive cable core. It is sometimes desirable to seal this electrically-conductive connection against outside contaminants such as dirt and moisture in order to maintain the integrity of the electrically-conductive connection.

Conductive cable cores and terminals are commonly made of conductive metal(s). Interest in weight savings and cost savings in various applications such as automotive electrical wiring applications have made aluminum based cables an attractive alternative to copper based cables. However, some wiring and electrical connectors may remain copper based. Thus, there may be a transition somewhere in the electrical circuit between an aluminum based portion of the circuit and a copper based portion of the circuit. Often this transition may occur at the terminal because the terminal may include copper (e.g., tin-plated copper) based for reasons of size and complexity of shape that can be more easily achieved with copper based materials over aluminum based materials. A crimp interface connection of metal cable core (e.g., aluminum) to a different metal terminal (e.g., copper) can produce galvanic corrosion at the interface of the metal of lower nobility if an electrolyte such as salt water is present.

Various materials and techniques have been proposed to protect from moisture at electric cable terminal connections. However, since even a small amount of exposed metal at the interface can be susceptible to the effects of moisture, including significant galvanic corrosion, there continues to be a need for new approaches to providing robust terminal connections for electric wire and cable.

SUMMARY

In accordance with some embodiments, there is a method of sealing a wire terminal assembly comprising a conductive cable core connected to a conductive terminal along a conductive connection interface. According to the method, a coating composition is dispensed over the conductive connection interface. The coating composition comprises a polymerizable compound comprising an unsaturated bond, and (2) a free radical photoinitiator. The dispensed coating composition is then subjected to actinic radiation for a duration of less than 0.7 seconds.

BRIEF DESCRIPTION OF DRAWINGS

The subject matter herein is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
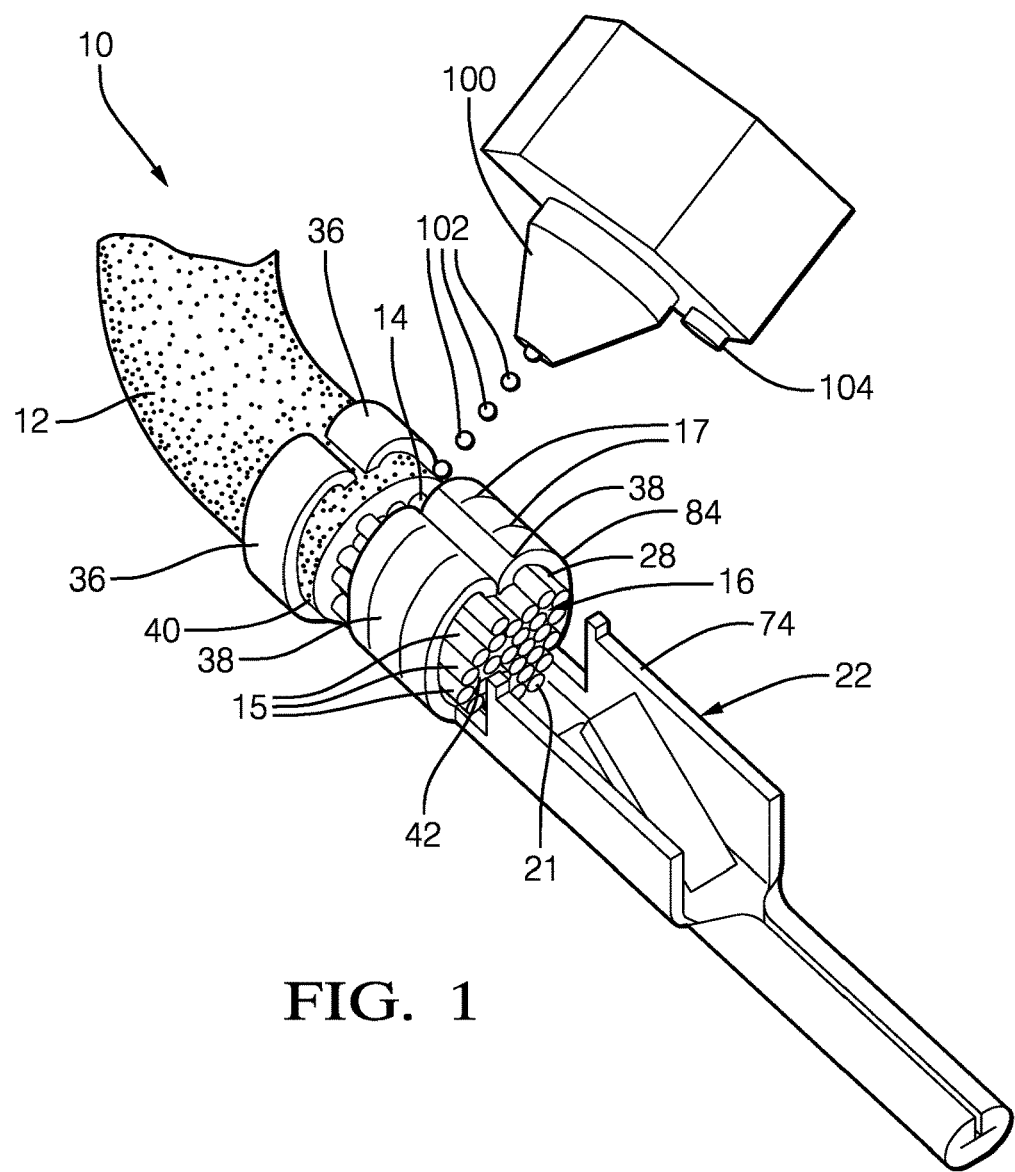
FIG. 1 is a schematic depiction in a perspective view of an example embodiment of a wire terminal assembly.

Referring now to the Figures, FIG. 1 depicts an exemplary embodiment of a cable 10 having an insulative outer cover 12 and a conductive core 14. The conductive core can comprise a first metal, which can include metal alloys. The conductive core 14 is depicted in FIG. 1 as comprising a grouping of individual strands 15 bundled and/or twisted together, but could also have other configurations such as a mono-element metal core. An end portion of an insulative outer cover 12 is removed to expose a lead 16 of the conductive core 14. A terminal 22 has a rearward portion 84 including a pair of insulation crimp wings 36 and a pair of core crimp wings 38 with a notch or gap 40. In some embodiments, the terminal 22 can comprise a second metal, which can include metal alloys. The insulation and core crimp wings 36 and 38 are crimped into a physical connection with cable 10 such that terminal 22 is secured to insulative outer cover 12 and makes electrical contact with lead 16 of the conductive core 14. Voids 42 may be formed between individual strands 15 of the conductive core 14 before or after terminal 22 is crimped onto cable 10. Core crimp wings 38 may optionally include serrations 17 to enhance the bite of core crimp wings 38 into the lead 16.

As further shown in FIG. 1, a coating applicator 100 dispenses a coating composition 102 at the interface of the lead 16 and the terminal 22. The coating applicator can be any type of applicator, including but not limited to one or more spray nozzles, brushes, rollers, or jet heads. In some embodiments, the spray applicator includes one or more jet heads. Jet applicators are known, and are described for example in U.S. Pat. Nos. 5,320,250; 5,747,102; and 6,253,957, and US Appl. Pub. No. 2016/0089681 A1, the disclosures of each of which are incorporated herein by reference in their entirety. In some embodiments, the jet head(s) can apply the coating composition while moving in a predetermined pattern above the terminal. The specific dispensing parameters can vary widely depending on the size and configuration of the terminal assembly being sealed. In some embodiments of interest, jet dispensing can be performed with a linear dispensing velocity in a range having a lower end of 0.1 mm/s, more specifically 5 mm/s, and even more specifically 10 mm/s, and an upper limit of 500 mm/s, more specifically 100 mm/s, and even more specifically 50 mm/s. In some embodiments of interest, the jet head(s) can dispense and apply fluid with a frequency range with a lower end of 1 Hz, more specifically 125 Hz, and an upper limit of 500 Hz, more specifically 250 Hz. In some embodiments of interest, the jet head(s) dispense numerous dots to form a uniform coating. In some embodiments, drop sizes between 2 nl and 2 ml, more specifically between 0.25 ml and 2 ml. The dispensing pulse can be set so that the valve is continually open, creating a steady stream with a maximum volume limited to the amount of material contained in the valve, e.g., 2 ml. In some embodiments, an actinic radiation source 104 such as an ultraviolet (UV) radiation source can be integrated with the coating applicator 100.

As mentioned above, the coating is applied to the conductive connection interface at any portion where it can be exposed to moisture. There may of course be some portions of the interface that are not directly coated (e.g., where a bit or gripping portion of the core crimp wings 38 is deeply engaged into and sealed against the conductive core 14 so that neither moisture nor the coating composition could penetrate); however, in some embodiments, the coating covers and seals all of the exposed portions conductive connection interface and adjoining exposed portions of the cable core and terminals. In some embodiments, the coating covers and seals all portions of the conductive cable core exposed outside of the insulating outer cover. As depicted in FIG. 1, the coating applicator 100 is applying the coating composition to the area of gap 40. In some embodiments of FIG. 1, the coating composition is applied to cover any one or combination or all of: the exposed portion of the conductive core 14 in the gap 40, the core crimp wings 38, the interface 28 between the core crimp wings 38 and the conductive core 14, a corresponding interface (not shown) between the core crimp wings 38 and the conductive core 14 in the area of gap 40, and the exposed portion of the conductive core 14 protruding past the core crimp wings 38 (including any voids 42 between strands 15, if present).

In some embodiments, a first metal of the core and a second metal of the terminal can be the same or can be different alloys of the same metal. In some embodiments, the first and second metals can be different metals. In some embodiments, the coating is applied to seal an electrically conductive connection interface between metals having different electrode potentials (defined as the electromotive force of a cell in which the electrode on the left is a standard hydrogen electrode and the electrode on the right is the electrode in question) in order to provide protection against moisture penetration that can cause galvanic corrosion. The difference in electrode potential needed to cause galvanic corrosion can vary widely based on a number of factors such as salt content in the penetrating moisture, surface areas of the exposed metals, distance through the liquid electrolyte between the metals, temperature, etc. Electrode potential differences commonly associated with galvanic corrosion can range from 0.15 to 1.8 volts. Examples of metal pairings where difference in electrode potential can lead to galvanic corrosion include aluminum and copper (e.g., aluminum cable core and terminals of copper or tin-plated copper). In some embodiments, the terminal can be formed from a metal that is more noble than the cable core metal. In some embodiments, the terminal can be formed from a metal that is less noble than the cable core metal. In some embodiments, the first and second metals can have the same electrode potential or can be the same metal. In such embodiments, the applied coating can still seal against moisture that can cause oxidation, even if there is no potential for galvanic corrosion.

Figure 2:
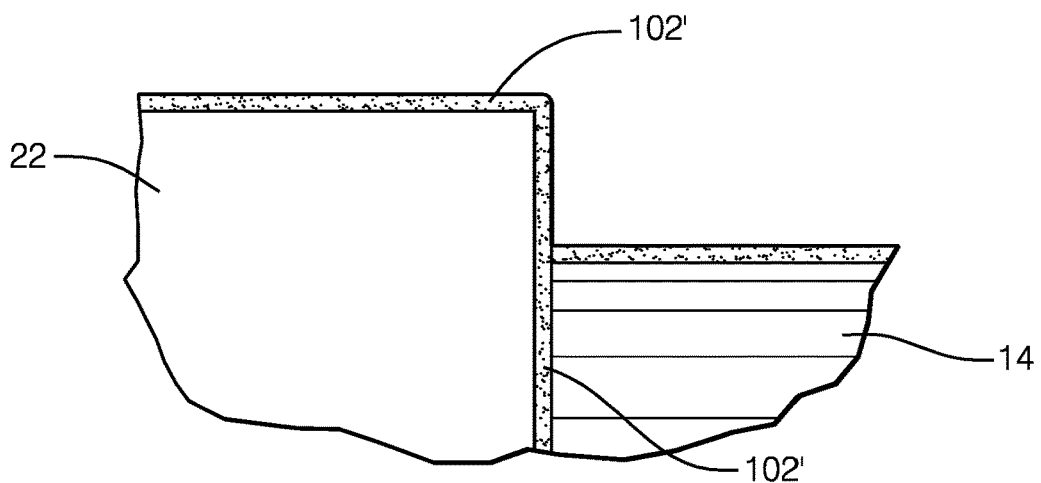
FIG. 2 is a schematic depiction in a cross-sectional view of an example embodiment of a coated portion of a terminal wire assembly.

In some embodiments, the process parameters of the application, and/or the properties of the coating composition (e.g., viscosity) can be adjusted or maintained to promote formation of a conformal coating at the interface between the lead and the terminal, including any gaps between the interface and the lead, or in adjacent areas (e.g., to promote coverage or filling of any voids 42 strands 15). In some embodiments, a conformal coating can be defined as one that conforms to the contours of the underlying substrate rather than fill gaps and levelling to form a level surface. In some embodiments, a coating such as a conformal coating can have a thickness in a range having a lower end of 50 µm, more specifically 75 µm, and even more specifically 100 µm, and an upper limit of 5 mm, more specifically 2 mm, more specifically 1 mm, and even more specifically 0.5 mm. For jet application as described above, useful viscosities for promoting conformal coatings can include those viscosity ranges mentioned above. An example of a coating such as a conformal coating is schematically depicted in FIG. 2, where a substrate comprising a portion of the conductive core 14 and the terminal 22 are coated with a coating 102'.

After application, the coating composition is cured via a free radical polymerization in response to activation of the photoinitiator. In some embodiments, an actinic radiation source 104 such as a UV light source can be integrated with coating applicator 100 as depicted in FIG. 1, facilitating sequential application of the coating composition followed by exposure to UV light. In some embodiments, the source of actinic radiation (e.g., the actinic radiation source 104) can be position within 10 mm of the coating composition. Theoretically, there is no specific minimum distance required between the source of actinic radiation, but in some embodiments practical considerations of positioning the source of actinic radiation can impose a minimum specified distance such as 1 mm.

Although this disclosure is not limited to or by any particular theory or mode of operation, it is believed that the specified actinic radiation exposure levels of free radical photoinitiator may contribute to promotion of relatively rapid polymerization at or near the surface of the coating exposed to radiation, and a slower rate of polymerization below the surface proximate to the conductive connection interface. A UV absorber may also contribute to this effect. Rapid polymerization at or near the surface may allow the coating to set up rapidly to provide efficient and rapid manufacturing and resistance to subsequent contamination from airborne contaminants, while the not fully cured interior of the coating can continue to provide flowability to penetrate and coat interstitial spaces around the conductive connection interface. In some embodiments, the coating can provide properties such as water resistance, flexibility, temperature-resistance, etc., while the monomer can contribute adjustment of coating composition properties such as viscosity and adhesion to provide for proper deposition and flow of the coating composition to all desired areas of the substrate, and the addition polymerization during cure, with the presence of highly-reactive free radical species such as those produced during the polymerization of (meth)acrylates and/or acrylic acid, can contribute to adhesion to and integration of the coating with the substrate.

As mentioned above, the coating composition is exposed to actinic radiation for a duration of less than 0.7 seconds. In some embodiments, the duration of actinic radiation exposure can be in a range with a low end of >0 seconds, 0.05 seconds, 0.1 second, 0.15 seconds, or 0.2 seconds, or 0.25 seconds, and an upper end of <0.7 seconds, 0.6 seconds, 0.5 seconds, or 0.4 seconds. The above lower and upper range endpoints can be independently combined to disclose a number of different ranges, and their disclosure above constitutes a disclosure of each possible combination. In some embodiments, the actinic radiation comprises UV radiation. In some embodiments, the actinic radiation includes a peak intensity at a wavelength in a range with a low end of 300 nm, 340 nm, 380 nm, or 390 nm, and a high end of 400 nm, 410 nm, 450 nm, or 490 nm. The above lower and upper range endpoints can be independently combined to disclose a number of different ranges, and their disclosure above constitutes a disclosure of each possible combination. In some embodiments, the coating is exposed to an amount of energy from the actinic radiation in a range with a low end of 0.5 joules, 1.0 joules, 1.5 joules, or 2.5 joules and a high end of 15 joules, 16 joules, or 17 joules. The above lower and upper range endpoints can be independently combined to disclose a number of different ranges, and their disclosure above constitutes a disclosure of each possible combination.

As mentioned above, the coating composition includes a polymerizable compound comprising an unsaturated bond. Examples of such compounds include monomers such as alkyl (meth)acrylates; alkoxyalkyl (meth)acrylates; (meth) acrylonitrile; vinylidene chloride; styrenic monomers; alkyl and alkoxyalkyl fumarates and maleates and their half-esters, cinnamates; and acrylamides; N-alkyl and aryl maleimides (meth)acrylic acids; fumaric acids, maleic acid; cinnamic acid; and combinations thereof. In some embodiments, the monomer comprises a (meth)acrylate monomer or acrylic acid. More specifically, example monomers can include are not limited to any particular species but includes various monomers, for example: (meth)acrylic acid monomers such as (meth)acrylic acid, methyl(meth)acrylate, ethyl (meth)acrylate, n-propyl (meth)acrylate, isopropyl (meth) acrylate, n-butyl (meth)acrylate, isobutyl (meth)acrylate, tert-butyl (meth)acrylate, n-pentyl (meth)acrylate, n-hexyl (meth)acrylate, cyclohexyl (meth)acrylate, n-heptyl (meth) acrylate, n-octyl (meth)acrylate, 2-ethylhexyl (meth)acrylate, nonyl (meth)acrylate, decyl (meth)acrylate, dodecyl (meth)acrylate, phenyl (meth)acrylate, toluyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylate, -(methacryloyloxypropyl)trimethoxysilane, (meth)acrylic acid-ethylene oxide adducts, trifluoromethylmethyl (meth) acrylate, 2-trifluoromethylethyl (meth)acrylate, 2-perfluoroethylethyl (meth)acrylate, 2-perfluoroethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoroethylethyl (meth)acrylate, 2-perfluorohexylethyl (meth)acrylate, 2-perfluorodecylethyl (meth)acrylate and 2-perfluorohexadecylethyl (meth)acrylate; styrenic monomers such as styrene, vinyltoluene, α-methylstyrene, chlorostyrene, styrenesulfonic acid and salts thereof; fluorine-containing vinyl monomers such as perfluoroethylene, perfluoropropylene and vinylidene fluoride; silicon-containing vinyl monomers such as vinyltrimethoxysilane and vinyltriethoxysilane; maleic anhydride, maleic acid, maleic acid monoalkyl esters and dialkyl esters; fumaric acid, fumaric acid monoalkyl esters and dialkyl esters; maleimide monomers such as maleimide, methylmaleimide, ethylmaleimide, propylmaleimide, butylmaleimide, hexylmaleimide, octylmaleimide, dodecylmaleimide, stearylmaleimide, phenylmaleimide and cyclohexylmaleimide; nitrile-containing vinyl monomers such as acrylonitrile and methacrylonitrile; amido-containing vinyl monomers such as acrylamide and methacrylamide; vinyl esters such as vinyl acetate, vinyl propionate, vinyl pivalate, vinyl benzoate and vinyl cinnamate; alkenes such as ethylene and propylene; conjugated dienes such as butadiene and isoprene; vinyl chloride, vinylidene chloride, allyl chloride, allyl alcohol, etc.

In some embodiments, the polymerizable compound can comprise an oligomer comprising at least two active double bonds. As used herein, an active double bond is a double bond that is reactive with free radical monomer units during free radical polymerization. Typically such double bonds are in end groups at a terminus of an oligomer backbone molecule, but can also be disposed in side groups appended to the oligomer. In some embodiments, the oligomer comprises an active double bond at each of the two termini of the oligomer backbone. In some embodiments, the oligomer can include one or more double bonds disposed in a side groups appended to the oligomer backbone. The implementation of side group double bonds allows for more than two active double bonds in the oligomer molecule, which can provide molecular branching loci in the polymerizate.

Oligomers can be assembled from conventional monomer building blocks as with polymers, but with process and ingredient controls used to control molecular weight (e.g., common techniques for controlling molecular weight growth include but are not limited to stoichiometric excess of one type of monomer for condensation reactions, use of monofunctional capping agents, polymerization catalyst quenchers, or reaction quenching processing such as a reduction of temperature). Oligomers and polymers are both characterized in the IUPAC Gold Book by their property of no significant change in properties by addition or removal of one or a few monomer units, and are distinguished by oligomers being of intermediate molecular mass and polymers being of high molecular mass. In some embodiments, the oligomers can have a degree of polymerization with a number of monomer units in a range having a low end of 5 monomer units, more specifically 10 monomer units, more specifically 20 monomer units, more specifically 50 monomer units, and even more specifically 100 monomer units, and an upper limit of 1000 monomer units, more specifically 500 monomer units, more specifically 200 monomer units, more specifically 150 monomer units, more specifically 125 monomer units, and even more specifically 100 monomer units. The above lower and upper range endpoints can be independently combined to disclose a number of different ranges, and their disclosure above constitutes a disclosure of each possible combination. In some embodiments, the oligomer has a degree of polymerization of 100-500 monomer units.

In some embodiments, the oligomer can be a difunctionally-unsaturated urethane oligomer, such as a urethane methacrylate. Such oligomers can be formed from polyurethane monomer building blocks of polyisocyanates and polyols, with an unsaturated bond-containing mono-hydroxy compound (e.g., a hydroxyl-containing (meth)acrylate) acting as a capping agent with respect to the polycondensation urethane chain-building reaction. Examples of polyisocyanates include hexamethylene diisocyanate, isophorone diisocyanate, cyclohexane-1,4-diisocyanate, methylene bis(4-cyclohexylisocyanate), toluene diisocyanate, diphenylmethane 4,4-diisocyanate, xylene diisocyanate, 1,4-phenylene diisocyanate, diisocyanates and triisocyanates of HDI-based oligomers, and other aliphatic and aromatic isocyanates. Examples of polyols include diols such as ethylene glycol, propylene glycol, 1,3-propanediol, 1,2, 1,3 or 1,4 butanediols, 2-methyl-1,3-propane diol (MPDiol), neopentyl glycol (NPG), alkoxylated derivatives of such diols, polyether diols, polyester diols, and the like. Higher functional polyols can include trimethylol propane (TMP), PETA, di-TMP, di-PETA, glycerol, alkoxylated derivatives thereof, and the like. A mono-hydroxy-containing unsaturated compound such as a hydroxyl-containing (meth)acrylates can be used to provide the oligomer with a terminal group comprising an unsaturated bond. Examples of hydroxyl-containing (meth)acrylates are hydroxyethyl (meth)acrylate, hydroxypropyl (meth)acrylate, hydroxybutyl (meth)acrylate, trimethylolpropane mono- and di-(meth)acrylate, pentaerythritol mono-, di-, tri-(meth)acrylate, dipentaerythritol mono-, di-, tri-, tetra-, and penta-(meth)acrylate, neopentyl glycol (meth)acrylate, hexanediol mono(meth)acrylate, tris(2-hydroxyethyl)isocyanurate mono- and di(meth)acrylate, polypropylene glycol mono(meth)acrylate, polyethylene glycol mono (meth)acrylate, polypropylene/polyethylene glycol mono(meth)acrylate, polybutyl glycol mono(meth)acrylate, polytetramethylene glycol mono(meth)acrylate, hydroxy polycaprolactone mono(meth)acrylate, and ethoxylated and propoxylated derivatives thereof. The terminal group on the oligomer can also include unsaturated groups other than acrylate groups. For example, U.S. Pat. No. 6,559,260 discloses urethane oligomers terminated with allyl groups.

Urethane oligomers can be prepared with or without catalysts. In the case where catalyst is used, various different catalysts can be used. Catalyzed reactions are desirable due to the shortened reaction time and fewer by-products. Typical catalysts which may be used for this reaction are amines and metal-based catalysts. Some examples include dibutyltin dilaurate, 1,4-diazabicyclo[2.2.2]-octane (DABCO), 1,8-diazabicyclo-[5.4.0]-undec-7-ene (DBU), N,N-dimethylcyclohexylamine (DMCA), tetramethyltin, tetrabutyltin, tetraoctyltin, tributyltin chloride, dibutyltin dichloride, dimethyltin oxide, trimethyltin chloride, dimethyltin dichloride, trioctyltin chloride, dibutyltin oxide, dibutyltin diacetate, butyltin trichloride, dioctyltin dichloride, dioctyltin oxide, dioctyltin dilaurate, and dioctyltin diacetate. Zinc, iron, bismuth, and zirconium complexes similar to—those tin-based complexes set forth above could also be used as catalysts. Urethane oligomers can be formed by reacting the polyol(s) with a molar excess of the polyisocyanate(s) followed by reacting the resultant isocyanato-terminated product with the hydroxy functional (meth)acrylate(s), or in an alternative method the polyisocyanate(s), hydroxy functional (meth)acrylate(s), and metal salt polyol(s) can be mixed and reacted in one step. In the condensation reaction, one can use between 0.5 and 2.0, preferably 0.75 and 1.5, more specifically between 0.9 and 1.1 equivalents of isocyanate for each equivalent of hydroxyl. In this manner, free alcohol or free isocyanates remaining in the final material can be avoided. The final, condensed product will include (meth)acrylate functionalities that can be cured with free radical mechanism such as peroxides or radiation curing processes.

In some embodiments, the oligomer can include aliphatic hydrocarbon chain segments of 4-10 carbon atoms, more specifically 6-8 carbon atoms. Such aliphatic segments can be incorporated into the oligomer chain through the monomer (e.g., C6 segments in hexamethylene diisocyanate, C5 segments in 1,5-pentanediol).

In some embodiments, the oligomer can include polyester segments. Such segments can be prepared in a polycondensation reaction of polyol with polyacid. Polyols useful in preparing polyesters for use in this invention are polyfunctional alcohols of the type conventionally utilized in polyester preparation. Such polyols include ethylene glycol, 1,5-propanediol, propylene glycol, triethylene glycol, butylene glycol, glycerol, diethylene glycol, 1,4,6-hexanetriol, trimethylolpropane, trimethylolethane, dipropylene glycol, pentaerythritol, neopentyl glycol, alkoxylated 2,2-bis(4-hydroxyphenyl) propane and the like. Although diols are generally utilized in the preparation of unsaturated polyesters, more highly functional polyols, i.e., polyols having a functionality of three to five, can also be used. In addition, a polyethylenically unsaturated monomer such as dicyclopentadiene or Bisphenol A dicyclopentadiene and derivatives thereof can be included. Examples of polycarboxylic acids optionally useful in preparing unsaturated polyesters used in this invention include phthalic acid, phthalic anhydride, isophthalic acid, tetrahydrophthalic acid, hexahydrophthalic acid, endomethylene tetrahydrophthalic acid, glutaric acid, tetrachlorophthalic acid, suberic acid, hexachloroendomethylene tetrahydrophthalic acid, sebacic acid, tetrahydrophthalic anhydride, succinic acid, adipic acid, and the like, wherein the term "acid" includes the corresponding anhydrides where such anhydrides exist. Terminal groups comprising unsaturated bonds can be provided with hydroxy (meth)acrylate chain terminators, or with unsaturated mono-acids, including but not limited to maleic acid, citraconic acid, fumaric acid, glutaconic acid, itaconic acid, chloromaleic acid, mesaconic acid, and the like, wherein the term "acid" is used to include the corresponding anhydrides where such anhydrides exist. Polyester molecules can be formed through known transesterification condensation reaction and catalyzation techniques. Aliphatic segments can be included in the polyacid (e.g., C8 segments in sebacic acid, C5 segments in 1,5-pentane diol).

In some embodiments, the oligomer can have both polyurethane and polyester segments. For example, a polyester diol can be prepared using the polyester-formation techniques and incorporated as part of the polyol reactant in forming a urethane oligomer such as a urethane acrylate oligomer.

Oligomers as described above are commercially available, and are described in various US patent references, including US published application nos. US 2004/0054798 A1, US 2003/0149179 A1, US 2005/0154121 A1, and U.S. Pat. Nos. 6,472,069, 6,559,260, 6,380,278, the disclosures of each of which are incorporated herein by reference in their entirety.

As mentioned above, the coating composition includes greater than 4 parts per hundred by weight of a free radical photoinitiator, based on the total weight of polymerizable compound. Some free radical photoinitiators can produce free radicals by unimolecular fragmentation in response to exposure to external energy. The radicals are produced by a homolytic or heterolytic cleavage of a sigma bond in the molecule. Examples of this type of photoinitiator include but are not limited to peroxides, and peroxy compounds, benzoin derivatives (including ketoxime esters of benzoin), acetophenone derivatives, benzlketals, α-hydroxyalkylphenones and α-aminoalkylphenones, O-acyl α-oximinoketones, acylphosphine oxides and acylphosphonates, thiobenzoic S-esters, azo and azide compounds, triazines (e.g., trichloromethyl triazines, tribromomethyl triazines, aryl iodides), and biimidazoles.

Some free radical photoinitiators can produce free radicals by bimolecular hydrogen abstraction in response to exposure to external energy. The hydrogen abstraction photoreactive group transforms to an excited state and undergoes an intermolecular reaction with a hydrogen donor to generate the free radical, leading to the formation of a pair of radicals originating from two different molecules. Examples of this type of photoinitiator include but are not limited to quinones, benzophenones, xanthones and thioxanthones, ketocoumarins, aromatic 1,2 diketones, and phenylglyoxylates.

Photoreactive aryl ketones can include acetophenone, benzophenone, anthraquinone, anthrone, and anthrone-like heterocycles (i.e., heterocyclic analogs of anthrone such as those having N, O, or S in the 10-position), or their substituted (e.g., ring substituted) derivatives. Examples of aryl ketones include heterocyclic derivatives of anthrone, including acridone, xanthone, and thioxanthone, fluorone, which terms are defined herein as including their ring substituted derivatives. The photoreactive groups of such ketones are capable of photochemical excitation with the initial formation of an excited singlet state that undergoes intersystem crossing to a triplet state. The excited triplet state can insert into carbon-hydrogen bonds by abstraction of a hydrogen atom (from a support surface, for example), thus creating a radical pair. Subsequent collapse of the radical pair leads to formation of a new carbon-carbon bond. If a reactive bond (e.g., carbon-hydrogen) is not available for bonding, the ultraviolet light-induced excitation of the benzophenone, acetophenone or anthraquinone group is reversible and the molecule returns to ground state energy level upon removal of the energy source. Photoactivatable aryl ketones such as benzophenone, anthraquinone and acetophenone are of particular importance inasmuch as these groups are subject to multiple reactivation in water and hence provide increased coating efficiency.

Another class of photoreactive groups includes compounds having an Si—Si bond. The radicals generated upon the breakage photo-induced cleavage of the Si—Si bond to provide reactive sites. Examples of Si—Si bond cleavage can be found in J. Lalevee, M. El-Roz, F. Morlet-Savery, B. Graff, X. Allonas and J. P. Fouassier, "New Highly efficient Radical Photoinitiators based on Si—Si Cleavage" Macromolecules, 2007, 40, 8527-8530, the disclosure of which is incorporated by reference in its entirety. Examples of such photoinitiators include 10,10'-bis(10-phenyl-10H-phenoxasilin (Sigma-Aldrich, St. Louis Mo.) and 9,9'-dimethyl-9,9'-bis-9H-9-silafluorene.

Free radical photoinitiators are commercially available and include, for example, IRGACURE compounds from BASF, H-Nu compounds from Spectra (e.g., H-Nu-470-LT5), and DAROCURE 1173 BASF. Free radical initiators include fluorones (including fluorone derivatives) as disclosed in U.S. Pat. Nos. 5,451,343, 5,395,862, the disclosures of which are incorporated herein by reference in their entirety.

As mentioned above, the coating composition includes an amount of free radical photoinitiator, expressed as parts per hundred by weight based on the total weight of monomer or other polymerizable compound (i.e., based on the total weight of polymerizable compound) (phm), of at least 4 phm. In some embodiments, the coating composition includes at least 6 phm of free radical photoinitiator. In some embodiments, the coating composition includes at least 8 phm of free radical photoinitiator. In some embodiments, the coating composition includes at least 10 phm of free radical photoinitiator. In some embodiments, the coating composition includes an amount of free radical photoinitiator in a range with a low end of >4 phm, or 6 phm, 8 phm, or 10 phm, and an upper end of 12 phm, 14 phm, or 16 phm. All possible combinations of the above-mentioned range endpoints are explicitly included herein as disclosed ranges.

In some embodiments, the coating composition can include a UV absorber. UV absorbers can include those described cyano substituted butamines such as those described in U.S. Pat. No. 4,849,326, acetylenic compounds such as those described in U.S. Pat. No. 4,839,274, substituted styrenes such as those described in U.S. Pat. No. 5,215,876, hydroxyphenyl benzotriazoles such as those described in EP 0 451 813, Schofield et al, EP 0 190 003, or U.S. Pat. No. 5,084,375, triazines such as those described in EP 0 531 258 or EP 0 530 135, cyanomethyl sulfone-derived merocyanines such as those described in U.S. Pat. No. 3,723,154, thiazolidones, benzotriazoles and thiazolothiazoles such as those described in U.S. Pat. No. 2,739,888, 3,253,921 or 3,250,617, triazoles such as those described in U.S. Pat. Nos. 2,739,971, 4,783,394, 5,200,307, 5,112,728, and Leppard et al EP 0 323 408, EP 0 363 820, DD 288 249, U.S. Pat. No. 3,004,896, hemioxonols such as those described in Wahl U.S. Pat. No. 3,125,597 and Weber et al U.S. Pat. No. 4,045,229, acidic substituted acidic substituted methane oxonols such as described in EP 0 246 553, and Liebe et al EPO 0 345 514, the disclosures of which are hereby incorporated by reference. Inorganic compounds such as nano-titanium dioxide can also be used. In some embodiments, the coating composition can include an amount of UV absorber in a range in a range with a low end of >0 parts per million by weight (ppm), 500 ppm, 1000 ppm, or 1500 ppm, and an upper end of 2000 ppm, 2500 ppm, or 3000 ppm, based on the total weight of monomer or other polymerizable compound. All possible combinations of the above-mentioned range endpoints (excluding impossible combinations where a low endpoint would have a greater value than a high endpoint) are explicitly included herein as disclosed ranges.

The aforementioned polymerizable compounds, free radical photoinitiators, and UV absorber may be used singly, sequentially, or in combination. From the desirability of physical properties of products, one or more classes of monomer may be chosen for the coating composition to apply to the conductive connection interface. In some embodiments, the monomer includes one or more (meth) acrylates or acrylic acid.

The coating composition can include various additives and coating aids, as known in the art. Additives and coating aids can include, but are not limited to dyes (static or fluorescent), surfactants, thickeners, stabilizers, pigments, fillers, and other known coating additives.

In some embodiments, the coating composition can have a viscosity at 40° C. in a range having a low limit of 100 cp, more specifically 200 cp, and more specifically 300 cp, and an upper limit of 4500 cp, more specifically 2500 cp, and more specifically 1500 cp. All possible combinations of the above-mentioned range endpoints are explicitly included herein as disclosed ranges. In some embodiments, the coating composition can have a viscosity of 300-1000 cp at 40° C. In some embodiments, the coating composition can have a viscosity of 200-800 cp at 40° C. The viscosity of the coating composition can be manipulated by varying respective amounts of the oligomer and monomer, with lower viscosities promoted by higher proportions of monomer in the coating composition, and higher viscosities promoted by higher proportions of oligomer in the coating composition.

When both oligomer and monomer are present in the coating composition, the respective amounts of oligomer and monomer can vary, depending on the target properties of the application process and the final coating. In some example embodiments, the composition can comprise at least 50 wt. % oligomer and less than 100 wt. % oligomer, and greater than 0 wt. % monomer and less than or equal to 50 wt. % monomer.

In some embodiments, the coated substrate can be treated with a corrosion-inhibiting oil, which can include conventional untreated mineral oils or a mineral oils with corrosion-inhibiting additives such as phosphates (e.g., zinc dithiophosphate). The oil can be applied by conventional means such as with a spray or brush. Examples of corrosion-inhibiting oils include conventional mineral oil and other commercially-available oils such as Ecoline 3690, Nye 531J, Nye 561J, or Richards Apex 562CPD. Application of the oil to the coated components can be made by various techniques, including but not limited to jet, spray, or tool-applied using tools such as brushes, sponges, or rollers.

The following examples are intended to further describe and not to limit the present disclosure.

EXAMPLES

Example 1

Coating compositions were prepared containing 70 wt. % of a urethane acrylate oligomer (CN961H81 from Sartomer Corp.), 20 wt. % of lauryl acrylate monomer, and 10 wt. % acrylic acid monomer, based on the total weight of the coating composition. A free radical photoinitiator (H-NU-470-LT5 from Spectra Corp.) and/or a UV absorber (Tinopal OB CO from BASF) were included in some of the coating compositions as set forth in the Table below. The coating compositions were applied to 0.75 mm$^2$ Delphi cable which was terminated with a Delphi terminal #13781251, using a robotic jet coater and cured using an LED UV lamp emitting at 395 nm for durations specified in the Table. The coatings were applied to 0.75 mm$^2$ terminated aluminum cable leads in approx. 2-3 seconds without contamination of the mating portion of the terminal. The coated assemblies were subjected to 24 hours of exposure to an aqueous acid solution containing 4.2 wt. % hydrochloric acid and 5 wt. % of sodium chloride, and the aluminum content of the aqueous solution was measured to determine the amount of aluminum lost from the wire terminal assembly.

TABLE

| Sample # | Initiator (phm) | UV Absorber (ppm) | UV exposure (seconds) | Dissolved Al (ppm) |
|---|---|---|---|---|
| 1 | 4 | 0 | 0.35 | 9.4 |
| 2 | 4 | 0 | 0.7 | 29.6 |
| 3 | 4 | 0 | 4.0 | 23.0 |
| 4 | 10 | 0 | 0.5 | 8.4 |
| 5 | 10 | 1500 | 0.3 | 1.2 |
| 6 | 10 | 15,000 | 0.3 | 1.3 |

As can be seen from the results in the Table, terminals coated with the coatings comprising higher amounts of photoinitiator had significantly improved performance against aluminum loss.

While the subject matter herein has been described in detail in connection with only a limited number of embodiments, it should be readily understood that it is not limited to such disclosed embodiments. Rather, the embodiments described herein can be modified to incorporate any number of variations, alterations, substitutions or equivalent arrangements not heretofore described, but which are commensurate with the spirit and scope of the disclosure. Additionally, while various embodiments have been described, it is to be understood that some implementations may include only some of the described embodiments. Accordingly, the disclosure is not to be seen as limited by the foregoing description.

The invention claimed is:

1. A method of sealing a wire terminal assembly comprising a conductive cable core and a conductive terminal connected to the conductive cable core along a conductive connection interface, the method comprising:
   dispensing a coating composition over the conductive connection interface, the coating composition comprising:
   (1) a polymerizable compound comprising an unsaturated bond, and
   (2) a free radical photoinitiator; and
   exposing the coating composition to actinic radiation from an actinic radiation source positioned within 10 mm of the coating composition for a duration of less than 0.7 seconds.

2. The method of claim 1, comprising exposing the coating composition to actinic radiation for a duration of less than 0.6 seconds.

3. The method of claim 1, comprising exposing the coating composition to actinic radiation for a duration of less than 0.5 seconds.

4. The method of claim 1, comprising exposing the coating composition to actinic radiation for a duration of less than 0.4 seconds.

5. The method of claim 1, comprising exposing the coating composition to actinic radiation for a duration of at least 0.2 seconds.

6. The method of claim 1, wherein the actinic radiation comprises UV radiation.

7. The method of claim 6, wherein the actinic radiation includes a peak wavelength between 380 nm and 400 nm.

8. The method of claim 1, comprising exposing the coating composition to 0.5-16 joules of energy from the actinic radiation.

9. The method of claim 1, wherein the coating composition comprises greater than 4 parts per hundred by weight of the free radical photoinitiator, based on the total weight of polymerizable compound.

10. The method of claim 9, wherein the coating composition comprises at least 6 parts per hundred by weight of the free radical photoinitiator, based on the total weight of polymerizable compound.

11. The method of claim 9, wherein the coating composition comprises at least 8 parts per hundred by weight of the free radical photoinitiator, based on the total weight of polymerizable compound.

12. The method of claim 9, wherein the coating composition comprises at least 10 parts per hundred by weight of the free radical photoinitiator, based on the total weight of polymerizable compound.

13. The method of claim 1, wherein the coating composition comprises at least 1000 parts per million by weight of an ultraviolet light absorber, based on the total weight of polymerizable compound.

14. The method of claim 1, wherein the coating composition further comprises an oligomer comprising at least two unsaturated bonds.

15. The method of claim 1, wherein the cable further comprises an electrically insulating outer cover, from which a lead portion of the cable core extends, and wherein the conductive connection interface comprises a crimp connection of a structure of the terminal onto the lead portion of the cable core and a crimp connection onto the electrically insulating outer cover.

16. The method of claim 1, wherein the coating has a cured thickness of 50 μm to 5 mm.

17. The method of claim 1, wherein the actinic radiation comprises UV radiation.

18. The method of claim 1, wherein the coating composition further comprises an oligomer comprising at least two unsaturated bonds.

19. A method of sealing a wire terminal assembly comprising a conductive cable core and a conductive terminal connected to the conductive cable core along a conductive connection interface, the method comprising: dispensing a coating composition over the conductive connection interface, the coating composition comprising: (1) a polymerizable compound comprising an unsaturated bond, (2) a free radical photoinitiator, and (3) at least 1000 parts per million by weight of an ultraviolet light absorber, based on the total weight of polymerizable compound; and exposing the coating composition to actinic radiation from an actinic radiation source positioned within 10 mm of the coating composition for a duration of less than 0.7 seconds.

20. The method of claim 19, wherein the coating composition comprises at least 1500 parts per million by weight of the ultraviolet light absorber, based on the total weight of polymerizable compound.

* * * * *